(12) United States Patent
Wisniewski et al.

(10) Patent No.: US 6,213,250 B1
(45) Date of Patent: *Apr. 10, 2001

(54) TRANSDUCER FOR ACOUSTIC LOGGING

(75) Inventors: Laurence T. Wisniewski; Abbas Arian; Georgios L. Varsamis, all of Houston, TX (US)

(73) Assignee: Dresser Industries, Inc., Dallas, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/161,052

(22) Filed: Sep. 25, 1998

(51) Int. Cl.⁷ ...................................................... G01V 1/40
(52) U.S. Cl. ........................................... 181/104; 181/108
(58) Field of Search ..................... 181/102, 104, 181/106, 111, 112, 108; 367/25, 28–32, 35, 47, 86

(56) References Cited

U.S. PATENT DOCUMENTS

| 2,918,651 | 12/1959 | Podolak et al. . |
| 3,188,607 | 6/1965 | Woodworth . |

(List continued on next page.)

FOREIGN PATENT DOCUMENTS

| 1 166 148 | 4/1984 | (CA) . |
| 35 04011 A1 | 8/1986 | (DE) . |
| 0 317 386 | 10/1988 | (EP) . |
| 0 388 316 | 3/1990 | (EP) . |
| 0 552 833 A1 | 7/1993 | (EP) . |
| 0 660 136 A2 | 6/1995 | (EP) . |
| 0 671 547 A1 | 9/1995 | (EP) . |
| 0 679 910 A2 | 11/1995 | (EP) . |
| 0 747 732 A2 | 12/1996 | (EP) . |
| 0 778 473 A2 | 6/1997 | (EP) . |
| 2139336 | 5/1971 | (FR) . |
| 2199595 | 9/1972 | (FR) . |
| 1 534 854 | 12/1978 | (GB) . |
| 2 071 847 | 9/1981 | (GB) . |
| 2 165 356 | 4/1986 | (GB) . |
| 2 266 372 | 10/1993 | (GB) . |
| 93/07512 | 4/1993 | (WO) . |
| WO 93/15421 | 8/1993 | (WO) . |
| WO 94/10587 | 5/1994 | (WO) . |
| WO 95/14845 | 6/1995 | (WO) . |
| 98/05981 | 2/1998 | (WO) . |

OTHER PUBLICATIONS

Chudy, S., et al. "Cased Hole Acoustic Logging—A Solution to a Problem." SPWLA 36th Annual Logging Symposium, Jun. 26–29, 1995, Paper I.

(List continued on next page.)

*Primary Examiner*—Khanh Dang
(74) *Attorney, Agent, or Firm*—Howard L. Speight

(57) ABSTRACT

An acoustic logging apparatus includes a tool body and a housing. A transducer operating in the bending mode is mounted in the housing. The transducer operates such that it is excited by or emits acoustic energy in only one of the two directions substantially perpendicular to the face of the transducer. The housing is mounted substantially removed from the axis of the body. An acoustic receiver includes an outer sleeve having a flange and a hat slidably mounted within the outer sleeve. The sliding of the hat compensates for variations in pressure and temperature. An acoustic transmitter includes a main housing and a hat slidably supported within the main housing. The sliding of the hat compensates for variations in pressure and temperature. Combinations of air gaps and o-rings in the transducer acoustically isolate a piezoelectric crystal from its housing and the housing from its enclosure. The acoustic receiver and acoustic transmitter are configured to be replaced in the field.

63 Claims, 13 Drawing Sheets

U.S. PATENT DOCUMENTS

| | | |
|---|---|---|
| 3,363,118 | 1/1968 | Sims . |
| 3,930,217 | 12/1975 | Wiley . |
| 4,131,875 | 12/1978 | Ingram . |
| 4,319,345 | 3/1982 | Dennis . |
| 4,562,557 | 12/1985 | Parks et al. . |
| 4,594,691 | 6/1986 | Kimball et al. . |
| 4,606,014 | 8/1986 | Winbow et al. . |
| 4,649,525 | 3/1987 | Angona et al. . |
| 4,658,383 | 4/1987 | Zimmer . |
| 4,665,511 | 5/1987 | Rodney et al. . |
| 4,698,791 | 10/1987 | Cunningham . |
| 4,703,460 | 10/1987 | Kurkjian et al. . |
| 4,791,619 | 12/1988 | Liu . |
| 4,825,117 | 4/1989 | Thomas, III et al. . |
| 4,845,616 | 7/1989 | Phillips . |
| 4,872,526 | 10/1989 | Wignall et al. . |
| 4,899,844 | 2/1990 | Katahara et al. . |
| 4,951,267 | 8/1990 | Chang et al. . |
| 5,027,331 | 6/1991 | Winbow et al. . |
| 5,044,461 | 9/1991 | Aronstam . |
| 5,063,542 | 11/1991 | Petermann et al. . |
| 5,170,018 | 12/1992 | Potier . |
| 5,229,553 | 7/1993 | Lester et al. . |
| 5,229,939 | 7/1993 | Scheibner et al. . |
| 5,265,067 | 11/1993 | Chang . |
| 5,357,481 | 10/1994 | Lester et al. . |
| 5,377,160 * | 12/1994 | Tello et al. .............................. 367/35 |
| 5,387,767 | 2/1995 | Aron et al. . |
| 5,398,215 | 3/1995 | Sinha et al. . |
| 5,475,650 | 12/1995 | Sinha et al. . |
| 5,510,582 | 4/1996 | Birchak et al. . |
| 5,521,882 | 5/1996 | D'Angelo et al. . |
| 5,544,127 | 8/1996 | Winkler . |
| 5,644,186 | 7/1997 | Birchak et al. . |
| 5,728,978 | 3/1998 | Roberts et al. . |
| 5,780,784 | 7/1998 | Robbins . |
| 5,796,677 | 8/1998 | Kostek et al. . |

OTHER PUBLICATIONS

Forbes, Douglass. "Detection of Gas Migration Behind Casing Using Ultrasonic Imaging Methods." Petroleum Society of CIM and AOSTRA Technical Conference, 1991, V. 1, Bannf, CA (Paper No. CIM/A OSTRA 91–39), pp. 39–1 through 39–15.

Minear, John W. "Full Wave Sonic Logging: A Brief Perspective." SPWLA 27th Annual Loggins Symposium, Jun. 9–13, 1986, Paper AAA, pp. 1–21.

Nakkan, E. et al. "Characteristics of Drill Bit Generated Noise." SPWLA 31st Annual Logging Symposium, Jun. 24–27, 1990, Paper X, pp. 1–11.

Kokesh, F.P., et al. "A New Approach to Sonic Logging and Other Acoustic Measurements." SPE 30th Annual Fall Meeting, Houston, 1964.

Minear, J. et al. "Compressional Slowness Measurements While Drilling." SPWLA 36th Annual Logging Symposium, Jun. 26–29, 1995, Article VV, pp. 1–12.

Morris, C.F., et al. "A New Sonic Array Tool for Full Waveform Logging." SPE 13285, 59th Annual Technical Conferenceand Exhibition, Houston, 1984.

Smith, M.L., et al. "The Amoco Array Sonic Logger." The Log Analyst, May–Jun. 1991, pp. 201–214.

Williams, D.M., et al. "The Long Spaced Acoustic Logging Tool." SPWLA 25th Annual Logging Symposium, Jun. 10–13, 1984, pp. 1–16.

Zemanek, J., et al. "Continuous Acoustic Shear Wave Logging." SPWLA 25th Annual Logging Symposium, Jun. 10–13, 1984, pp. 1–14.

Block, L.V. et al. "Velocity Analysis of Multi–Receiver Full–Waveform Acoustic–Logging Data in Open and Cased Holes." Log Analyst, May–Jun. 1991, pp. 188–200.

Coppens, F. et al. "Application of the Intercept Time Method to Full Wave Form Acoustic Data." First Break, vol. 13, No. 1, Jan. 1995, pp. 11–20.

Dillon, P.B., et al. "On Timing the VSP First Arrival." Geophysical Prospecting 33, pp. 1174–1194, 1985.

Douze, E.J. et al. "Statistics of Semblance." Geophysics, vol. 44, No. 12, Dec. 1979, pp. 1999–2003.

Gelchinsky, B. "Automatic Picking of First Arrivals and Parametrization of Traveltime Curves." Geophysical Prospecting, 31, 1983, pp. 915–928.

Haldorson, J.B.U. et al. "Suppression High–Energy Noise Using an Alternative Stacking Procedure." Geophysics, vol. 54, No. 2, Feb. 1989, pp. 181–190.

Cheng, C.H., et al. "Elastic Wave Propagation, in a Fluid–Filled Borehole and Synthetic Acoustic Logs." Geophysics, vol. 46, No. 7, Jul. 1981, pp. 1042–1053.

Cheng, C.H., et al. "Determination of In Situ Attenuation From Full Waveform Acoustic Logs." Journal of Geophysical Research. vol. 87, No. B7, Jul. 10, 1982, pp. 5477–5484.

Paillet, F.L. "Predicting the Frequency Content of Acoustic Waveforms Obtained in Boreholes." SPWLA 22nd Annual Logging Symposium, Jun. 23–26, 1981, Paper SS, pp. 1–29.

Peterson, E.W. "Acoustic Wave propagation Along a Fluid–Filled Cylinder." Journal of Applied Physics, vol. 45, No. 8, Aug. 1974, pp. 3340–3350.

Wuenschel, P.C. "Seismogram Synthesis Including Multiples and Transmission Coefficients." Geophysics, vol. 25, No. 1, Feb. 1960, pp. 106–129.

Arditty, P.C. et al. "Characterization of Fractured Hydrocarbon Reservoirs Using the EVA Acoustic Logging Tool." The Log Analyst, May–Jun. 1991, pp. 215–232.

Aron, J., et al. "Sonic Compressional Measurements While Drilling." SPWLA 35th Annual Logging Symposium, Jun. 19–22, 1994, pp. 1–17.

Chang, S.K., et al. "A Study of Sonic Logging in a Cased Borehole." SPE 11034, 57th Annual Fall Technical Conference and Exhibition, New Orleans, Sep. 26–29, 1982, pp. 1–7.

Esmersoy, C. et al. "Fracture and Stress Evaluation Using Dipole–Shear Anisotropy Logs." SPWLA 36th Annual Logging Symposium, Jun. 26–29, 1995, Paper J, pp. 1–12.

Fortin, J.P., et al. "Reflection Imaging Around a Well With the EVA Full–Waveform Tool." Log Analyst, May–Jun. 1991, pp. 271–278.

Harrison, A.R., et al. "Acquisition and Analysis of Sonic Waveforms From a Borehole Monopole and Dipole Source for the Determination of Compressional and Shear Speeds and Their Relation to Rock Mechanical Properties and Surface Seismic Data." SPE 20577, 65th Annual Technical Conference and Exhibition, New Orleans, 1990, pp. 267–282.

Kokesh, F.P. et al. "Geometrical Factors in Sonic Logging." Geophysics, vol. 24, No. 1, Feb. 1959, pp. 64–76.

Hsu, K. et al. "Application of the Maximum–Likelihood Method (MLM) for Sonic Velocity Logging." Geophysics, vol. 51, No. 3, Mar. 1986, pp. 780–787.

Kanasewih, E.R. et al. "Nth–root Stack Nonlinear Multichannel Filter." Geophysics, vol. 38, No.. 2, Apr. 1973, pp. 327–338.

Kimball,, C. et al. "Semblance Processing of Borehole Acoustic Array Data." Geophysics, vol. 49, No. 3, Mar. 1984, pp. 274–281.

Kurkjian, A.L. et al. "Slowness Estimation From Sonic Logging Waveforms." Geoexploration, 27 (1991), pp. 215–256.

Mari, J.L. et al. "An Artificial Intelligence Approach for the Picking of Waves on Full–Waveform Acoustic Data." Proceedings of the Conference on Artificial Intelligence in Petroleum Exploration and Production, Houston, Texas 1992, pp. 211–219.

Mari, J.L. et al. "Slowness and Delay in Acoustic Logging." SPWLA 36th Annual Logging Symposium, Jun. 26–29, 1995, pp. 1–11.

McFadden, P.L., et al. "The Nth–Root Stack: Theory, Applications and Examples." Geophysics, vol. 51, No. 10, Oct. 1986, pp. 1879–1892.

Willis, M.E. et al. "Automatic P and S Velocity Determination from Full Waveform Digital Acoustic Logs." Geophysics, vol. 48, No. 12, Dec. 1983, pp. 1631–1644.

ANSI S1.20–1988 (ASA 75–1988) Revision of ANSI S1.20–1972). "Procedures for Calibration of Underwater Electroacoustic Transducers." pp. 1–38.

Bobber, R.J. "General Reciprocity Parameter." Journal of Acoustical Society of America, vol. 39, No. 4, 1966, pp. 680–687.

Goetz, J.F. et al. "An Investigation Into Discrepancies Between Sonic Log and Seismic Check Spot Velocities." Journal of Australian Petroleum Exploration Association, 1979, pp. 131–141.

Ellis, Darwin V. "Well Logging for Earth Scientists." Elsevier Science Publishing Co., New York, NY, 1987, pp. 339–437.

Anderson, Herbert L., A Physicist's Desk Reference, The Second Edition of Physics Vade Mecum, American Institute of Physics, New York, NY, 1989, Chapter 2.00.

* cited by examiner

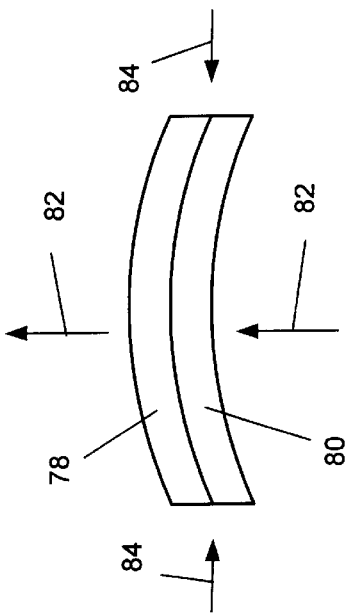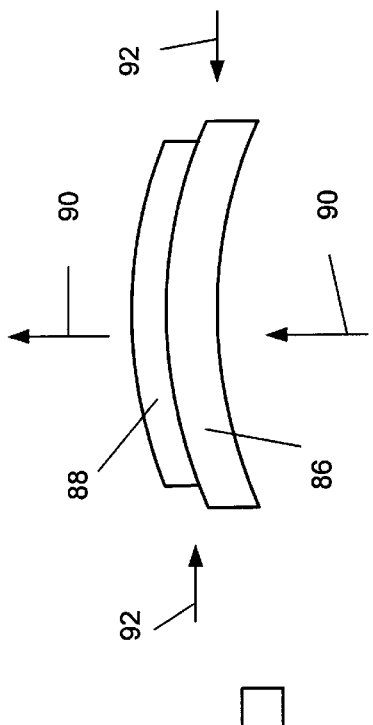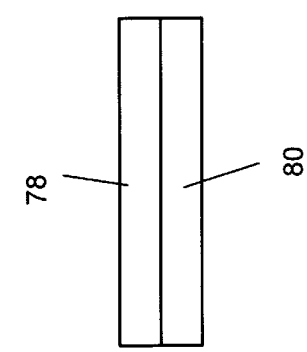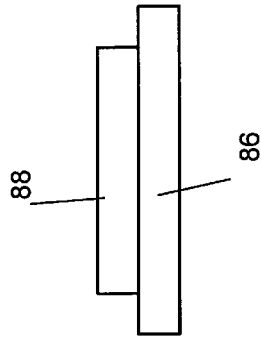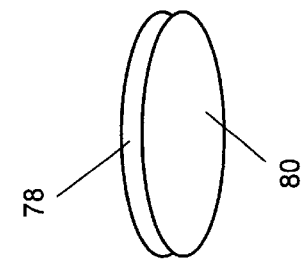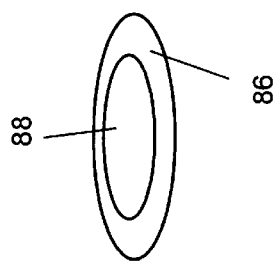

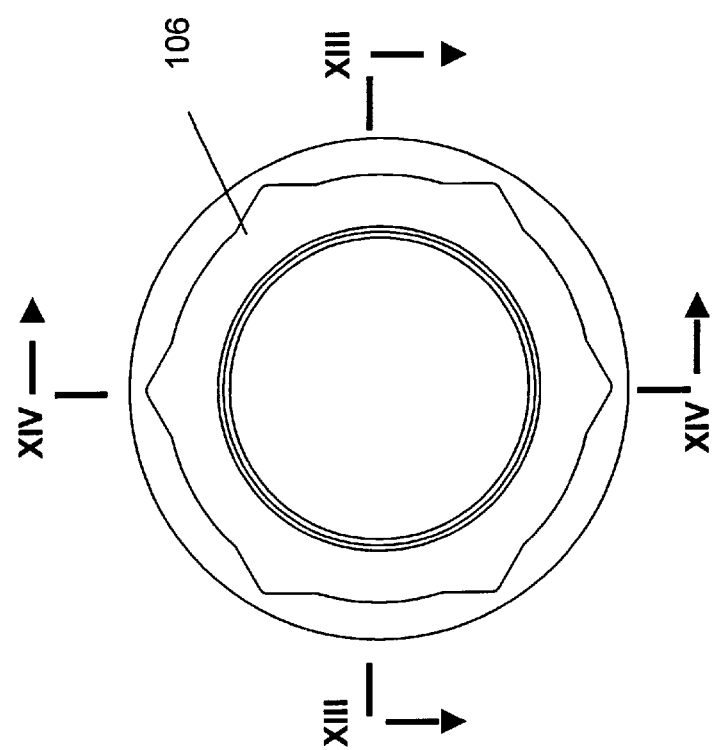
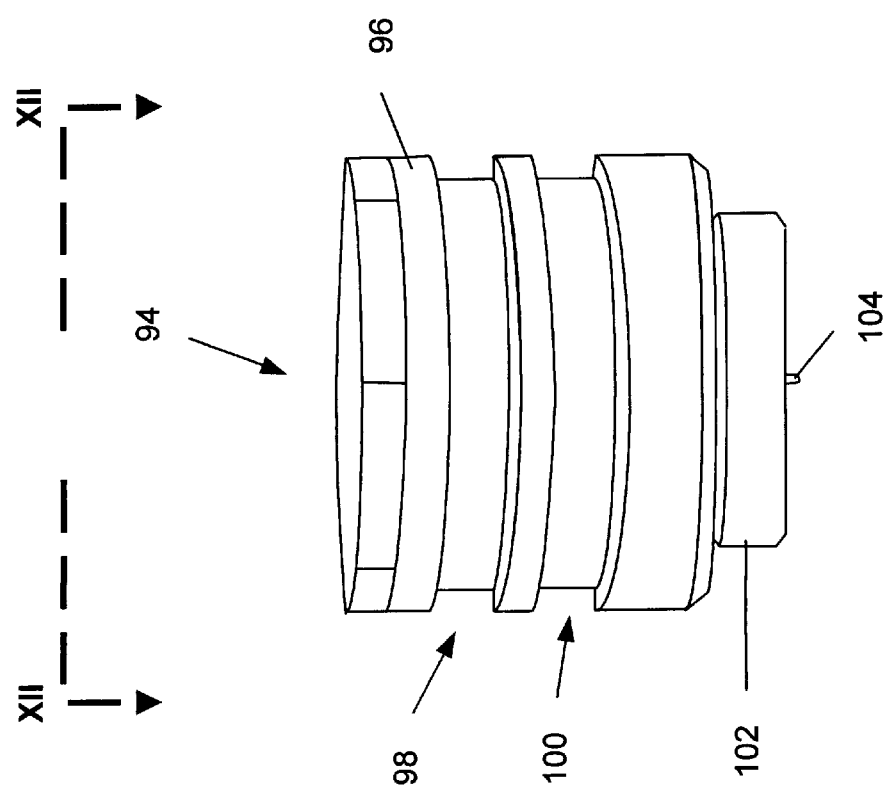
Fig. 12
Fig. 11

TRANSDUCER FOR ACOUSTIC LOGGING

FIELD OF THE INVENTION

This invention relates generally to a method and apparatus utilized in hydrocarbon exploration. More specifically, the invention relates to the utilization of acoustic sources and receivers to determine acoustic properties of geologic formations as a logging tool traverses them, be it a wireline logging tool or a logging while drilling tool. More particularly, the present invention is directed to methods of and apparatus for converting between acoustic energy and electrical signals.

BACKGROUND OF THE INVENTION

Geologists and geophysicists are interested in the characteristics of the formations encountered by a drill bit as it is drilling a well for the production of hydrocarbons from the earth. Such information is useful in determining the correctness of the geophysical data used to choose the drilling location and in choosing subsequent drilling locations. In horizontal drilling, such information can be useful in determining the location of the drill bit and the direction that drilling should follow.

Such information can be derived in a number of ways. For example, cuttings from the mud returned from the drill bit location can be analyzed or a core can be bored along the entire length of the borehole. Alternatively, the drill bit can be withdrawn from the borehole and a "wireline logging tool" can be lowered into the borehole to take measurements. In still another approach, called "measurement while drilling" ("MWD") or "logging while drilling" ("LWD") tools make measurements in the borehole while the drill bit is working. There are a wide variety of logging tools, including resistivity tools, density tools, sonic or acoustic tools, and imaging tools.

An acoustic logging tool collects acoustic data regarding underground formations. The purpose of such a tool is to measure the "interval transit time" or the amount of time required for acoustic energy to travel a unit distance in a formation. In simple terms, this is accomplished by transmitting acoustic energy into the formation at one location and measuring the time that it takes for the acoustic energy to travel to a second location or past several locations. The measurement is complicated by the fact that the tool is roughly in the middle of a borehole of unknown diameter and is surrounded by mud. Further, the formation along the borehole may have been disturbed by the action of the drill bit and may no longer have the same acoustic characteristics as the undisturbed formation.

SUMMARY OF THE INVENTION

In general, in one aspect the invention features an acoustic logging apparatus comprising a tool body and a housing. A transducer operating in the bending mode is mounted in the housing. The transducer operates such that it is excited by or emits acoustic energy in only one of the two directions substantially perpendicular to the face of the transducer.

Implementations of the invention may include one or more of the following. The transducer may be a unimorph. The transducer may be a bimorph. The transducer may be utilized as an acoustic transmitter. The transducer may be utilized as an acoustic receiver.

In general, in another aspect, the invention features an acoustic logging apparatus comprising a tool body, a housing, a transducer operating in the bending mode mounted in the housing. The housing is mounted substantially removed from the axis of the body.

In general, in another aspect, the invention features an acoustic transmitter comprising a piezoelectric crystal for use in an acoustic logging tool configured to generate acoustic energy in response to an electric signal, the acoustic energy generated in a preferred direction being at least 3 dB larger than the acoustic energy generated in a direction substantially perpendicular to the preferred direction.

In general, in another aspect, the invention features an acoustic receiver comprising a piezoelectric crystal for use in an acoustic logging tool configured to generate an electrical signal in response to acoustic energy, the signal for acoustic energy of a magnitude received from a preferred direction being at least 3 dB larger than signals for acoustic energy of the magnitude received from a direction substantially perpendicular to the preferred direction.

In general, in another aspect, the invention features an acoustic transponder comprising an outer sleeve and an inner assembly coupled to the outer sleeve, the inner assembly being substantially acoustically isolated from the outer sleeve.

In general, in another aspect, the invention features an acoustic logging tool comprising an acoustic transmitter and an acoustic receiver. The acoustic receiver has a different electrical ground from the acoustic transmitter.

In general, in another aspect, the invention features an acoustic receiver for converting acoustic energy to an electronic signal comprising a hat, a piezoelectric crystal mounted within the hat, and a first compliant element separating the crystal from the hat.

Implementations of the invention may include one or more of the following. The hat may comprise a thermoplastic. The thermoplastic may comprise polyetheretherketone. The hat may comprise a metal. The acoustic receiver may include an excluder separated from the crystal by a second compliant element. The excluder may comprise a thermoplastic. The excluder may comprise a metal. The acoustic receiver may include a connector, a wire coupled to the connector and to the piezoelectric crystal, a portion of the wire being supported by the excluder.

In general, in another aspect, the invention features an acoustic receiver comprising an outer sleeve having a flange, a hat being slidably mounted within the outer sleeve.

Implementations of the invention may include one or more of the following. The hat may have a flange. The flange of the hat may move toward the flange of the outer sleeve as the hat slides into the outer sleeve. A first compliant element may be placed between the flange of the hat and the flange of the outer sleeve. The acoustic receiver may further comprise a piston, and a second compliant element between the piston and the hat. The acoustic receiver may further comprise a securing element configured to secure the piston relative to the outer sleeve. The securing element may comprise a snap ring. The acoustic receiver may comprise a lower housing coupled to the outer sleeve, a port through the lower housing for communicating with a chamber formed by the outer sleeve, the hat and the lower housing, pressure compensating fluid for filling the chamber, and a seal for preventing the pressure compensating fluid from escaping the chamber. The pressure compensating fluid may comprise oil. The seal may comprise one or more o-rings. The seal may separate the lower housing from the outer sleeve, and the hat from the outer sleeve. The compensation fluid, the hat, and the lower housing may compensate for pressure and temperature variations. A piezoelectric crystal may be secured within the assembly comprising the hat and the lower housing. The hat and crystal assembly may be configured to move relative to the lower housing. The movement may compensate for pressure and temperature variations.

In general, in another aspect, the invention features an acoustic transmitter comprising a main housing, and a hat slidably supported within the main housing.

Implementations of the invention may include one or more of the following. A compliant element may separate the hat from the main housing. A support element may rigidly separate the transducer housing from the compliant element. The support element may comprise metal. The support element may comprise a thermoplastic. The thermoplastic may comprise polyetheretherketone. The hat may comprise thermoplastic. The hat may comprise a metal.

The acoustic transmitter may comprise a piston engaging the main housing and a first compliant element separating the upper side of the hat from the piston. The acoustic transmitter may comprise a second compliant element configured to bias the hat against the first compliant element. The acoustic transmitter may comprise a connector coupled to the main housing, and a wire coupled to the connector, a portion of the wire being supported by the hat.

The acoustic transmitter may comprise a port through the main housing for communicating with a chamber formed by the main housing and the hat, pressure compensating fluid for filling the chamber, and a seal system for preventing the pressure compensating fluid from escaping the chamber. The pressure compensating fluid may comprise oil. The seal system may comprise one or more o-rings. The compensation fluid, hat, and lower housing may compensate for pressure and temperature variations. A piezoelectric crystal may be adhesively secured within the assembly comprising the hat and the lower housing. The hat and crystal assembly may be configured to move relative to the lower housing. The movement may compensate for pressure and temperature variations.

In general, in another aspect, the invention features an acoustic logging tool comprising an elongated body and an acoustic transducer mated to the body in such a way that the acoustic transducer can be replaced in the field.

In general, in another aspect, the invention features a method for transforming acoustic energy to an electrical signal comprising configuring a piezoelectric receiver in an acoustic logging tool to generate a signal in response to the acoustic energy, the signal for acoustic energy of a magnitude received from a preferred direction being at least 3 dB larger than signals for acoustic energy of the magnitude received from a direction substantially perpendicular to the preferred direction.

In general, in another aspect, the invention features a method for transforming an electrical signal to acoustic energy comprising configuring a piezoelectric transmitter in an acoustic logging tool to generate acoustic energy in response to the electric signal, the acoustic energy generated in a preferred direction being at least 3 dB larger than the acoustic energy generated in a direction substantially perpendicular to the preferred direction.

In general, in another aspect, the invention features a method for transforming between acoustic energy and an electrical signal comprising mounting a piezoelectric transducer in a hat, the hat being slidably mounted within a housing such that the hat slides into and out of the housing depending on the difference in pressure between the inside and the outside of the housing.

BRIEF DESCRIPTION OF THE DRAWINGS

FIGS. 5, 6, and 7 are representations of a bimorph transducer and the forces it generates or that act upon it.

FIGS. 8, 9, and 10 are representations of a unimorph transducer and the forces it generates or that act upon it.

FIG. 11 is a perspective view of an acoustic receiver according to the present invention.

FIG. 12 is a top view of an acoustic receiver according to the present invention.

DESCRIPTION OF THE PREFERRED EMBODIMENTS

Figure 1:
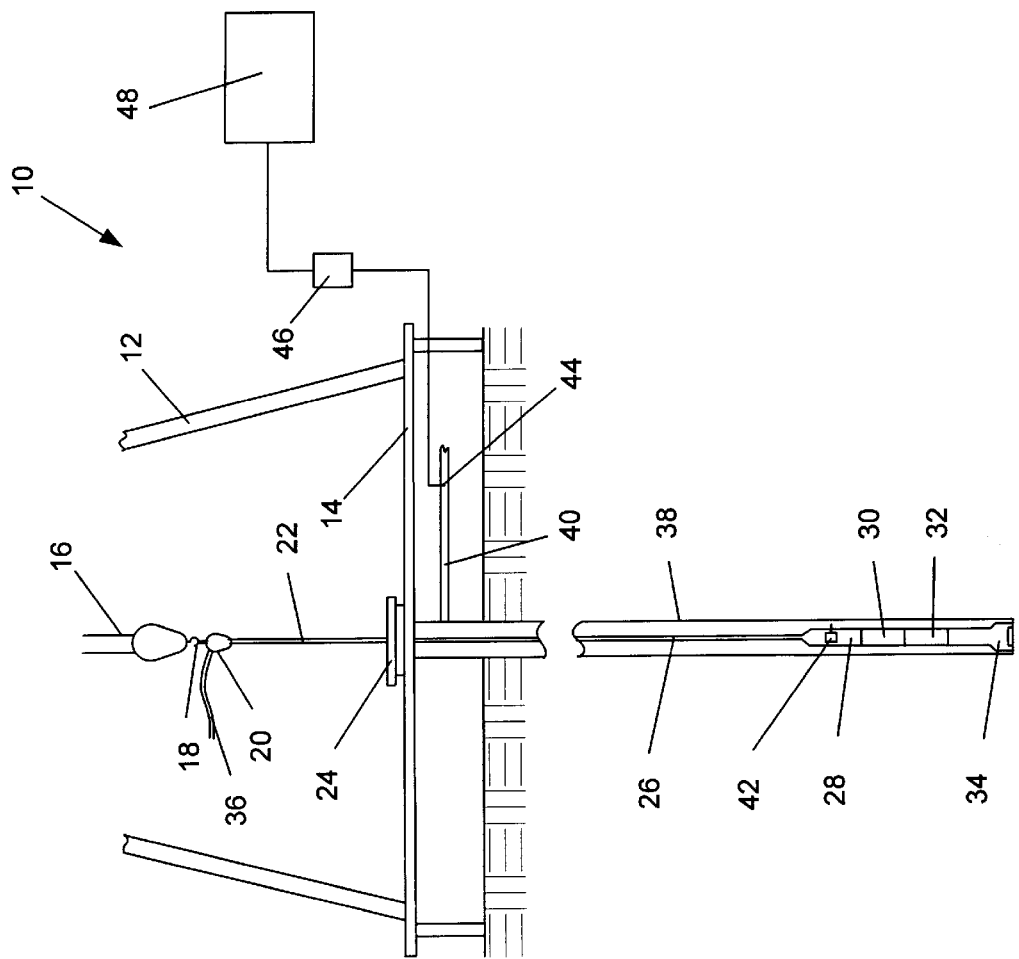
FIG. 1 is an illustration of a logging while drilling system incorporating an acoustic logging while drilling tool of the present invention.

As shown in FIG. 1, a drilling rig 10 (simplified to exclude items not important to this application) comprises a derrick 12, derrick floor 14, draw works 16, hook 18, swivel 20, kelly joint 22, rotary table 24, drillstring 26, drill collar 28, LWD tool 30, LWD acoustic logging tool 32 and drill bit 34. Mud is injected into the swivel by a mud supply line 36. The mud travels through the kelly joint 22, drillstring 26, drill collars 28, and LWD tools 30 and 32 and exits through ports in the drill bit 34. The mud then flows up the borehole 38. A mud return line 40 returns mud from the borehole 38 and circulates it to a mud pit (not shown) and back to the mud supply line 36.

The data collected by the LWD tools 30 and 32 is returned to the surface for analysis by telemetry transmitted through the drilling mud. A telemetry transmitter 42 located in a drill collar or in one of the LWD tools collects data from the LWD tools and modulates the data to transmit it through the mud. A telemetry sensor 44 on the surface detects the telemetry and returns it to a demodulator 46. The demodulator 46 demodulates the data and provides it to computing equipment 48 where the data is analyzed to extract useful geological information.

Figure 2:
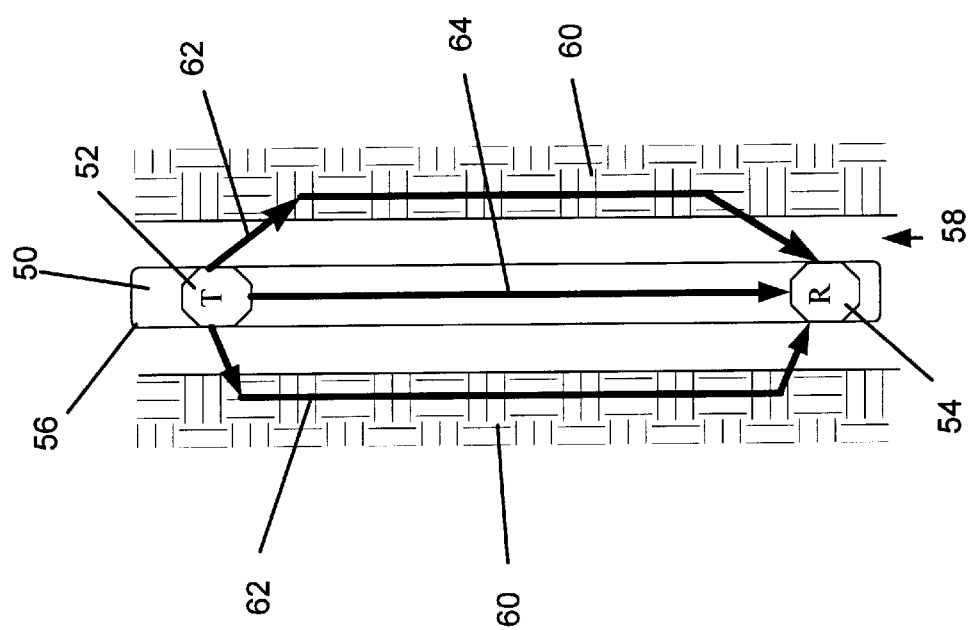
FIG. 2 is a representation of an acoustic logging tool.

In abstract, the acoustic logging tool 50 has an acoustic transmitter 52 and an acoustic receiver 54 supported by a body 56, as shown in FIG. 2. The acoustic logging tool 50 is part of a drill string (not shown) inserted in a borehole 58 through a formation 60. The acoustic transmitter 52 emits acoustic energy 62 into the formation 60. The acoustic energy 62 is refracted and travels through the formation 60 along the borehole 58. As it travels along the borehole 58, a portion of the acoustic energy 62 is emitted back into the borehole 58 where it is detected by the acoustic receiver 54. By measuring the elapsed time from the transmission of the acoustic energy 62 by the acoustic transmitter 52 to the receipt of the acoustic energy by the acoustic receiver 54, and processing the measurement, the "slowness" of the formation can be derived. Using the derived slowness of the formation and formation measurements made by other tools, a variety of formation characteristics can be derived.

Some acoustic energy 64 emitted by the acoustic transmitter 52 is transmitted into the body 56 of the acoustic logging tool 50 and travels along the body 56 to the acoustic receiver 54. The receipt of the acoustic energy 64 that travels along the body interferes with the acoustic energy 64 transmitted through the formation 60, making the "slowness" calculation more difficult or even impossible to perform.

An acoustic transducer according to the invention reduces the amount of acoustic energy that travels along the body by directing most of the acoustic energy it generates in a direction that is generally perpendicular to the body. Further, the acoustic transducer is configured to reduce the coupling between the element generating the transducer's acoustic energy and the body. The acoustic transducer is also configured to maintain the acoustic decoupling under the pressures and temperatures experienced during down hole operations. The acoustic transducer is further configured to operate under the conditions pertaining to down hole operations, i.e. pressure, temperature, shock, vibration, interaction with drilling fluid, interaction with formation fluid/gas.

Figure 3:
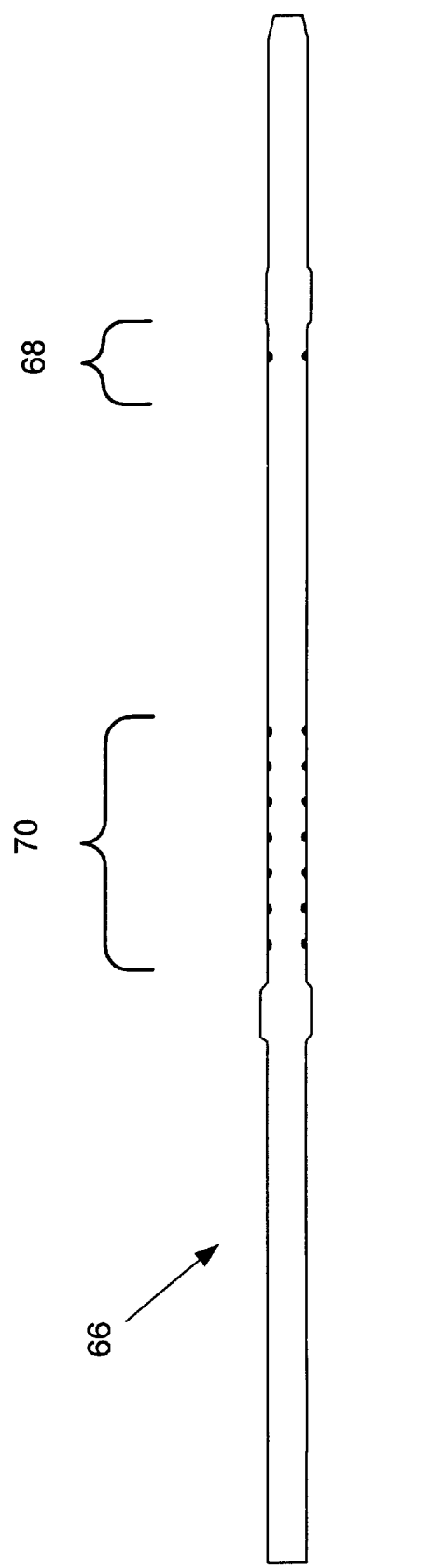
FIG. 3 is a plan view of an acoustic logging tool incorporating the present invention.

As shown in FIG. 3, a logging-while-drilling acoustic logging tool 66 comprises an array of transmitters 68 and an array of receivers 70. The illustrated acoustic logging tool 66 shows a transmitter array 68 comprising a pair of transmitters and a receiver array 70 comprising seven pairs of receivers. The invention is not limited to such an arrangement and can include any number of transmitters and receivers arranged in any orientations. The words "transponder", "transducer", "acoustic transponder" and "acoustic transducer" will be understood to apply to both acoustic receivers and acoustic transmitters. It is understood that the words "unimorph" and "bimorph" mean piezoelectric elements (crystals) operating in the "bending mode".

Figure 4:
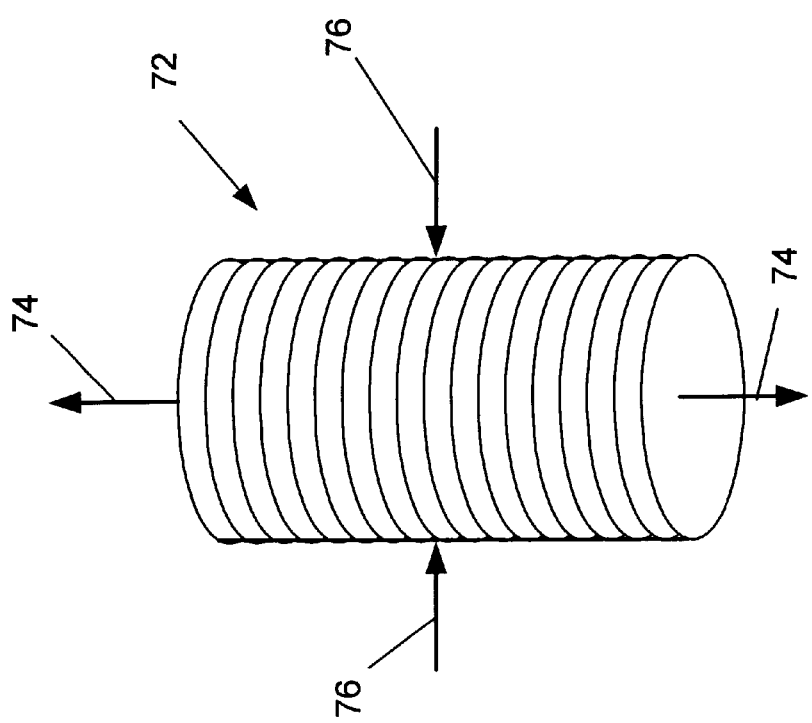
FIG. 4 is a representation of the forces generated by a piezoelectric crystal stack.

As illustrated in FIG. 4, some existing acoustic transducers comprise a stack of piezoelectric crystals 72. The crystals are oriented such that when operating as a transmitter an electric signal is applied to each crystal in the stack, causing the crystals to contract (expand) across the crystal face and expand (contract) in thickness thereby emitting acoustic energy. Consequently, the stack of crystals exerts an expanding force 74 perpendicular to the faces of the crystals and a contracting force 76 parallel to the faces of the crystals. The expanding force 74 is directed away from the tool and into the surrounding mud and formation. The contracting force, however, is directed into the tool parallel to the tool body and is likely to interfere with the acoustic velocity measurements unless it is controlled or confined. Conversely when operating as a receiver an acoustic energy field interacts with the crystals causing them to contract (expand) across the crystal face and expand (contract) in thickness, causing an electric signal to be generated that is substantially proportional to the acoustic energy in the field. The acoustic energy field interaction with the crystal face contains all the useful information required to perform acoustic measurements in acoustic logging. It is then preferred that the receiver embodiment minimizes or eliminates the sensitivity of the receiver to acoustic energy delivered to the transducer from a direction substantially parallel to the face of the crystal.

The invention uses a bimorph or unimorph transducer to generate acoustic energy (acoustic transmitter). It is well known to those skilled in the art that bimorphs and unimorphs are commercially available items. As shown in FIGS. 5 and 6, a bimorph comprises two piezoelectric crystals 78 and 80 bonded to each other. In an alternate embodiment the bimorph is constructed as two piezoelectric crystals bonded to each other through a metal disk. For ease of discussion the arrangement of FIG. 6 will be referenced, but those skilled in the art will appreciate that substantially the same discussion is valid for the bimorph constructed in the alternate way. The two crystals are oriented in such a way that upon an application of an electrical signal to them, crystal 78 expands across its face and crystal 80 contracts across its face. The combination of the expansion of crystal 78 and the contraction of crystal 80 causes the two crystals to arch, as shown in FIG. 7. This arching causes forces 82 to be generated perpendicular to the faces of the crystals. Forces 84 are also generated parallel to the faces of the crystals but they are generally substantially smaller than the corresponding forces 76 (shown in FIG. 4) generated by the crystal stack used in existing acoustic transmitters. The bimorph is oriented so that forces 82 are directed outward from the body of the tool. Consequently, most of the acoustic energy generated by the bimorph is directed out of the body of the tool and into the surrounding mud and formation.

Alternatively, the transducer may comprise a unimorph, as shown in FIG. 8. A unimorph comprises a layer of metal 86 with a piezoelectric crystal 88 bonded to it, as shown in FIGS. 8 and 9. When an electric signal is applied to the piezoelectric crystal 88 it contracts (or expands) and the metal layer 86 does not, as shown in FIG. 10. Consequently, the combination of the crystal 88 and the metal layer 86 bends and generates forces 90 generally perpendicular to the face of the crystal 88 and forces 92 generally parallel to the face of the crystal 88. Forces 92, which are generated parallel to the faces of the crystal, are generally substantially smaller than the forces generated by the crystal stack used in existing acoustic transmitters. The unimorph is oriented so that forces 90 are directed outward from the body of the tool. Consequently, most of the acoustic energy generated by the unimorph is directed out of the body of the tool and into the surrounding mud and formation.

The invention uses a bimorph or unimorph to transform acoustic energy into electrical energy (acoustic receiver). A piezoelectric crystal generates an electric signal when it is changed in one of its dimensions. For example, if a mechanical force is applied to a bimorph causing it to arch (bend) as shown in FIG. 7, crystal 78 is expanded across its face and crystal 80 is contracted across its face. If the two crystals are properly oriented, the electrical signals produced by their respective expansion and contraction add and provide an indication of the amount of bending (force) being exerted on the bimorph. A force applied parallel to the face of the crystals will have much less effect than a force applied perpendicular to the crystals. Consequently, an acoustic transducer comprising a bimorph will be more sensitive to acoustic energy acting perpendicular to its face than parallel to its face. A similar discussion applies to unimorph transducers in acoustic receivers.

Further, bimorphs and unimorphs have effective acoustic impedances that more closely match the acoustic impedance of the surrounding mud than single crystals or stacks of crystals, as described above. Consequently, more energy generated by a bimorph or unimorph will be transferred to/from the mud than with the single crystals or stacks of crystals used in existing transducers.

Consequently, because of the use of bimorphs and unimorphs, and because of the acoustic isolation techniques described below, an acoustic transmitter according to the invention, upon application of an electrical signal, generally generates between 3 dB and 100 dB more acoustic energy in a preferred direction than in a direction substantially perpendicular to the preferred direction. Preferably, the acoustic transmitter generates between 5 dB and 50 dB more acoustic energy in a preferred direction than in a direction substantially perpendicular to the preferred direction. More preferably, the acoustic transmitter generates between 5 dB and 20 dB more acoustic energy in a preferred direction than in a direction substantially perpendicular to the preferred direction. Preferably, the preferred direction is perpendicular to the face of the bimorph or the unimorph.

Further, because of the use of bimorphs and unimorphs, and because of the acoustic isolation techniques described below, an acoustic receiver according to the invention will generate an electrical signal having a magnitude between 3 dB and 100 dB greater for acoustic energy received from a preferred direction than for acoustic energy received from a direction substantially perpendicular to the preferred direction. Preferably, the invention will generate an electrical signal having a magnitude between 5 dB and 50 dB greater for acoustic energy received from a preferred direction than for acoustic energy received from a direction substantially perpendicular to the preferred direction. More preferably, the invention will generate an electrical signal having a magnitude between 5 dB and 20 dB greater for acoustic energy received from a preferred direction than for acoustic energy received from a direction substantially perpendicular to the preferred direction. Preferably, the preferred direction is perpendicular to the face of the bimorph or the unimorph.

In the acoustic receiver the unimorph or bimorph transducer is preferably not rigidly held at its edges. Consequently, the transducer in the acoustic receiver is damped and can act as a transducer for broadband acoustic energy. In contrast, the transducer in the acoustic transmitter is preferably only lightly damped.

It will be appreciated by those skilled in the art that a unimorph or bimorph transducer can be optimized to operate in different frequency ranges depending on the size of the crystal or crystals, and the size and type of the metal disk that is used. For the preferred embodiment the frequency ranges selected are those of interest in acoustic logging, i.e. from 2 kHz to 30 kHz.

As shown in FIG. 11, an acoustic receiver 94 comprises an outer sleeve 96. An external static seal system, comprising cavities 98 and 100 into which o-rings (not shown) may be seated, seals against hydrostatic pressure. The combination of the cavity (air gap) and o-rings seated in cavities 98 and 100 provide acoustic isolation between the acoustic receiver and the body of the acoustic logging tool. A threaded area 102 of the acoustic receiver 94 couples to an insert (not shown) within the acoustic logging tool. Thus, there is no contact between the acoustic receiver 94 and the body of the acoustic logging tool except through the insert and through the o-rings that seat in cavities 98 and 100. In the preferred embodiment the threaded area 102 of the acoustic receiver 94 couples to a ring (not shown) floating on an insert (not shown) within the acoustic logging tool. This method provides even better acoustic isolation between the receiver and the acoustic logging tool. A coaxial connector 104 provides a connection for the electrical signal generated by the acoustic receiver. The coaxial connector 104 has its own electrical ground that is separate from the electrical ground used by the acoustic transmitters. This feature limits the amount of electrical noise coupled from the acoustic transmitter to the acoustic receiver.

The acoustic receiver has a hexagonal socket 106, shown in FIG. 12, that allows the acoustic receiver to be gripped by a tool or by hand. This feature, along with the threaded connection to the insert provided by threaded area 102, allows the acoustic receiver to be changed in the field.

Figure 13:
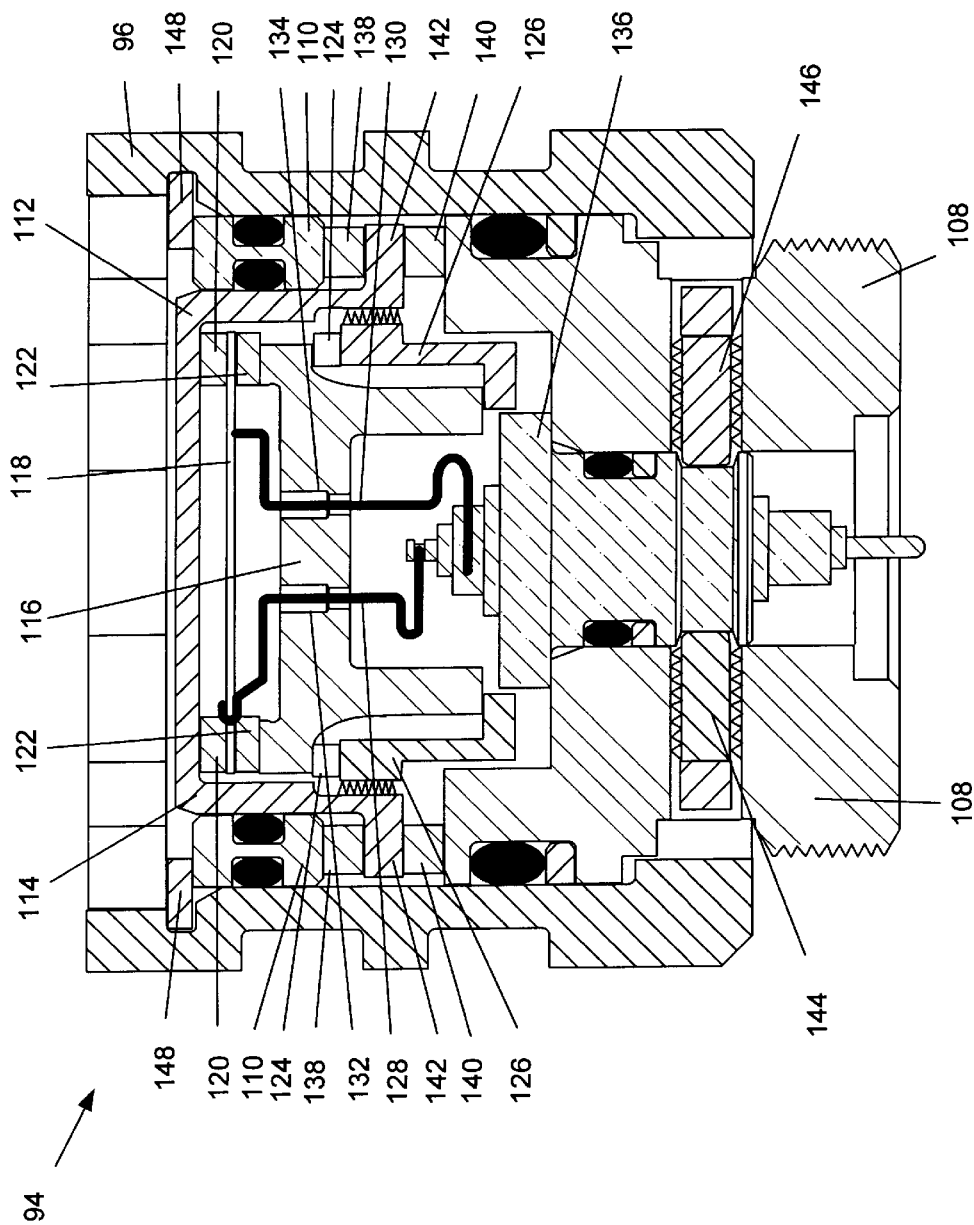
FIGS. 13 and 15 are a section views of an acoustic receiver according to the present invention along lines XIII on FIG. 12.

As shown in FIG. 13, an acoustic receiver is comprised of an outer sleeve 96, a lower housing 108, a pressure compensating piston 110, and a piezoelectric crystal/hat subassembly 112.

The outer sleeve 96 is made from suitable material to withstand the extreme temperature and pressure conditions of the downhole environment. The static seal system, discussed above, is used to withstand the high differential pressure between the well bore and the atmospheric conditions inside the tool. The air gap created on the outside diameter and the inside diameter of the outer sleeve 96 aid in reducing the level of the unwanted sonic waves travelling through the tool body.

The piezoelectric crystal/hat subassembly 112 is comprised of two housings 114 and 116 made of a suitable thermoplastic housings such as "peek" (Polyetheretherketon) or such similar material. In the preferred embodiment the upper housing (hat) is constructed from a metal. Piezoelectric ceramics 118, configured either as bimorphs or unimorphs, are sandwiched between two rubber washers 120 and 122, placed into the upper housing. The lower peek housing 116 preloads (through spring 124) the piezoelectric ceramics 118 inside the upper housing 114 using a peek nut 126. The lead wires 128 and 130 from the piezoelectric ceramics 118 are routed through and adhered into the grooves 132 and 134 inside the lower peek housing 116. This is done to prevent the wires 128 and 130 from moving under downhole shock and vibration and inducing unwanted signals into the piezoelectric ceramics. A hermetically sealed connector 136 terminates the lead-wires 128 and 130.

Two springs 138 and 140 (constructed as wave springs in the preferred embodiment) are placed on either side of a flange 142 of the upper peek housing 114 or "hat" in order to position the piezoelectric crystal/hat sub-assembly 112 in a null position and also in order to allow the assembly to be preloaded so that it can withstand handling, tripping in and out of hole and drilling conditions.

The piezoelectric crystal/hat sub-assembly 112, is inserted into the lower housing 108. This combination is inserted into and keyed to the outer sleeve 96. Two set screws 144 and 146 are installed into the lower housing 108 to hold the connector 136 in place relative to the lower housing 108.

The piston 110 is placed on the top of the upper spring 138 and held against the outer sleeve 96 using a snap ring 148. The piston 110 preloads the piezoelectric crystal/hat subassembly 112 inside the outer sleeve 96.

Figure 14:
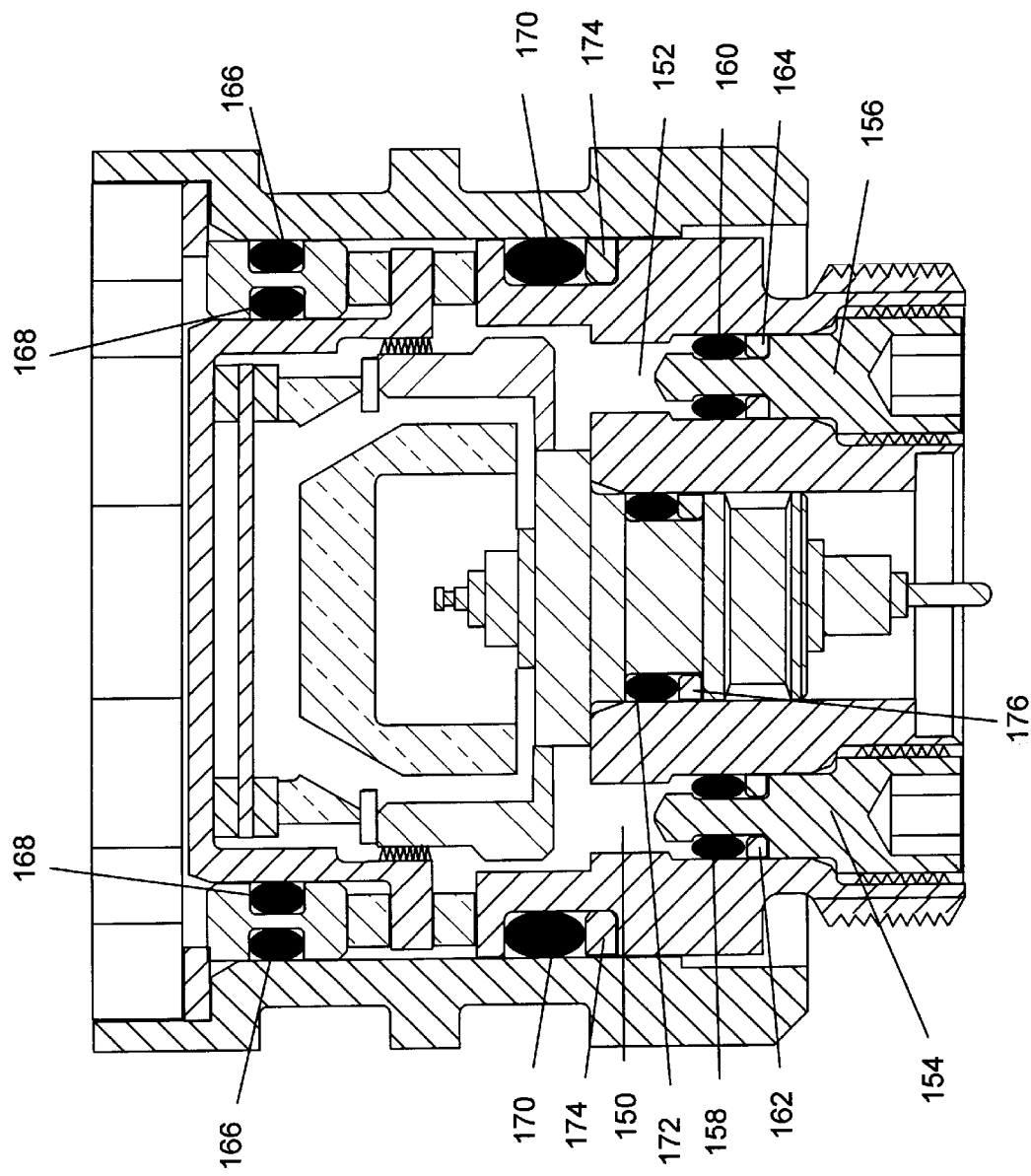
FIG. 14 is a section view of an acoustic receiver according to the present invention along lines XIV on FIG. 12.

An interior cavity formed by the outer sleeve 96, the lower housing 108 and the piezoelectric crystal/hat subassembly 112 is evacuated and filled through a pair of lower ports 150 and 152 with compensation fluid, as shown in FIG. 14. The ports 150 and 152 are fitted with plugs 154 and 156 having high pressure o-rings 158 and 160 and back-up rings 162 and 164.

A sealed system retains the compensating fluid inside the assembly and prevents the borehole fluid from reaching the internal cavity of the electronic insert assembly. The sealed system comprises o-rings 158, 160, 166, 168, 170, and 172 and backup rings 162, 164, 174 and 176. It will be appreciated by those skilled in the art that the system air gap/o-ring 166, 168 and 170 also acts as an acoustic isolator between the crystal/hat subassembly 112 and the outer sleeve 96. This acoustic isolation further isolates the crystal from acoustic energy imparted on the crystal from a direction parallel to its face.

Figure 15:
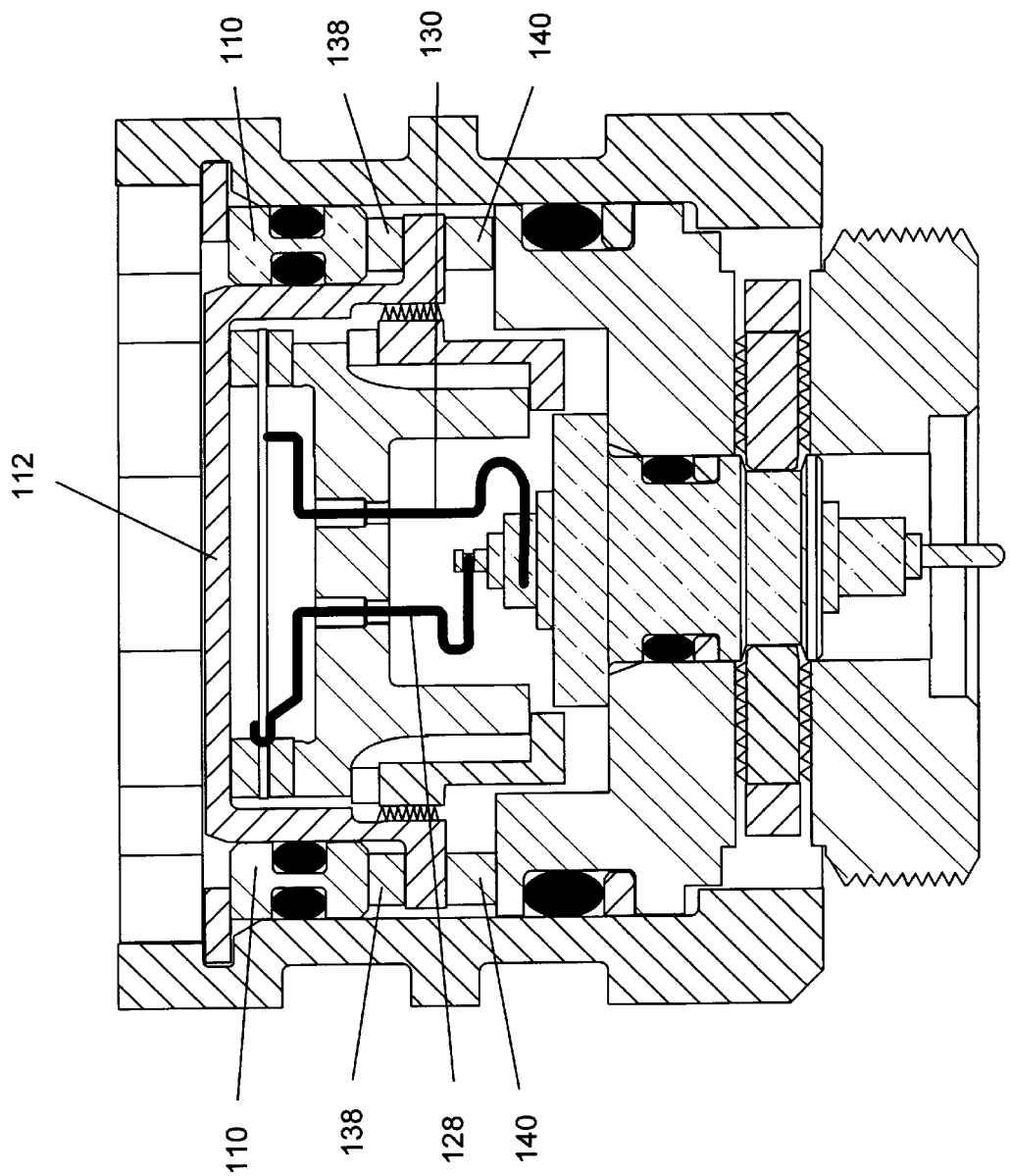

The oil volume inside the annular cavity will expand and contract with the changes in ambient pressure and temperature. Upon any increase of the oil volume due to temperature, the piezoelectric crystal/hat sub-assembly 112 will act as a piston and move upward, as shown in FIG. 15 (which is outward toward the bore hole wall when the acoustic receiver is installed in the tool body) compressing spring 138 and unloading spring 140. Consequently, the oil volume inside the cavity will expand. If however the oil volume contracts due to increase in the hydrostatic pressure, the piston 110 and the piezoelectric crystal/hat sub-assembly 112 can both move downward as separate compensating pistons to reduce the oil volume. When the piezoelectric crystal/hat subassembly moves downward, it compresses spring 140. When the piston 110 moves downward, it compresses spring 138. An adequate amount of lead wire 128 and 130 length and strain relief is provided to allow for the movement of the piezoelectric crystal/hat sub-assembly for temperature and pressure compensation relative to the electrical connector. When the piezoelectric crystal/hat sub-assembly is in the position shown in FIG. 15 and in the position shown in FIGS. 13 and 14 and in any position between those two positions, it has no direct contact with the outer sleeve 96 because the two parts are separated by o-rings 166 and 170. This separation provides some acoustic isolation between the piezoelectric crystal/hat sub-assembly and the outer sleeve.

Figure 16:
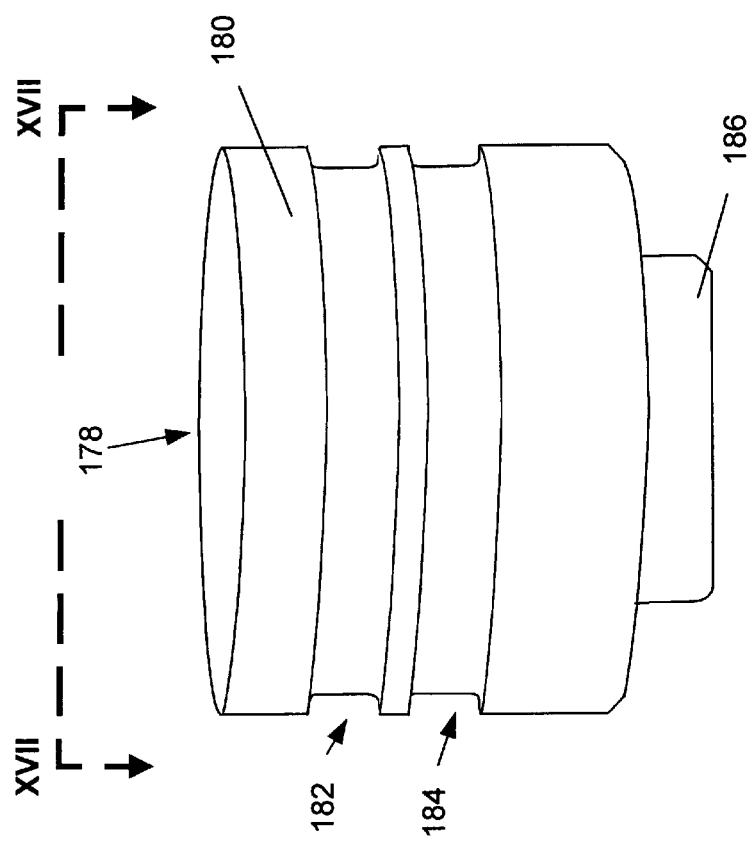
FIG. 16 is a perspective view of an acoustic transmitter according to the present invention.

As shown in FIG. 16, the acoustic transmitter 178 comprises an outer shell 180 having two cavities 182 and 184 into which o-rings (not shown) may be seated and seal against hydrostatic pressure. The combination of the cavity (air-gap) and o-rings seated in cavities 182 and 184 provide acoustic isolation between the acoustic transmitter and the body of the acoustic logging tool. A threaded area 186 of the acoustic transmitter 178 couples to an insert (not shown) within the acoustic logging tool. Thus, there is no contact between the acoustic transmitter 178 and the body of the acoustic logging tool except through the o-rings that seat in cavities 182 and 184 and through the insert. In the preferred embodiment the threaded area 186 of the acoustic transmitter 178 couples to a ring (not shown) floating on an insert (not shown) within the acoustic logging tool. This method provides even better acoustic isolation between the transmitter and the acoustic logging tool.

Figure 17:
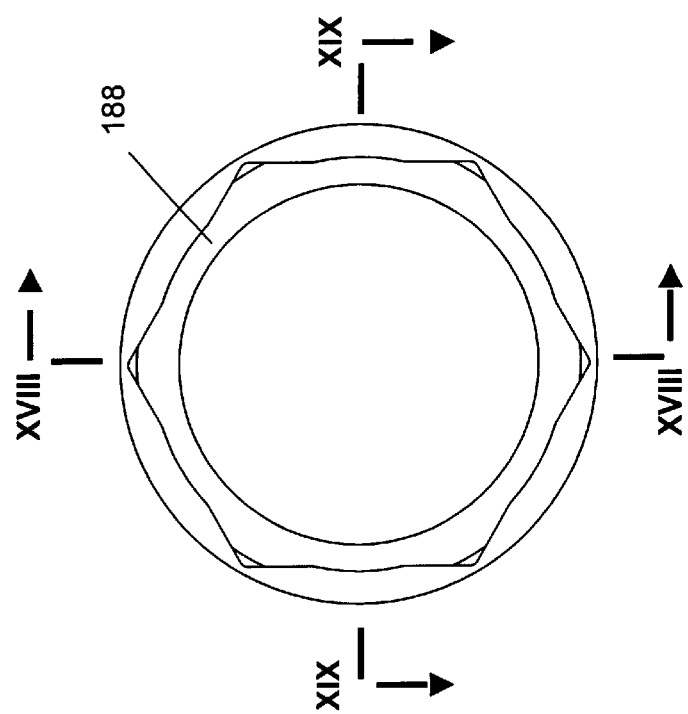
FIG. 17 is a top view of an acoustic transmitter according to the present invention.

The acoustic transmitter has a hexagonal coupling 188, as shown in FIG. 17, which allows the acoustic transmitter to be gripped by a tool or by hand. This feature, along with the threaded connection to the insert provided by threaded area 186, allows the acoustic transmitter to be changed in the field.

Figure 18:
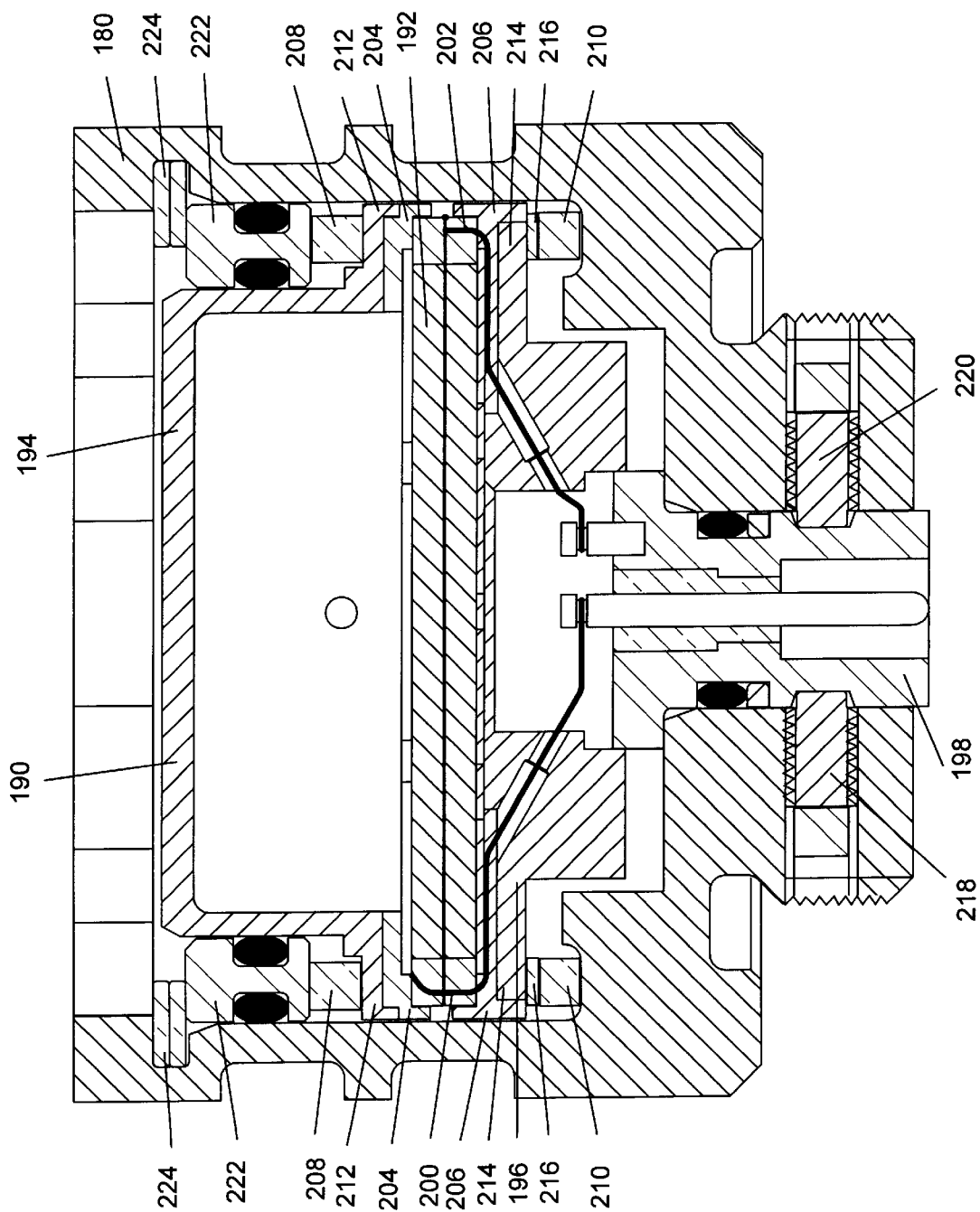
FIGS. 18 and 20 are section views of an acoustic transmitter according to the present invention along lines XVIII on FIG. 12.

As illustrated in FIG. 18, the acoustic transmitter comprises crystal/hat assembly 190, which comprises a piezoelectric crystal assembly 192 secured between upper peek housing 194 and lower peek housing 196. In the preferred embodiment the upper housing (hat) is constructed from a metal. The upper and lower peek housings 194 and 196 are made of a suitable thermoplastic material such as peek or a similar material. The piezoelectric crystal assembly 192 is pre-wired and located inside a recess in the lower peek housing 196. A hermetically sealed connector 198 is fitted into the outer shell 180 and fits within a recess in the opposite side of the lower peek housing 196 and terminates lead wires 200 and 202. The upper peek housing 194 also has a mating recess to accept the piezoelectric crystal assembly 192. The piezoelectric crystal assembly 192 is therefore sandwiched between an upper peek element 204 and a lower peek element 206 and is connected to the electrical connector 198 via the lead wires 200 and 202. In the preferred embodiment the piezoelectric crystal assembly 192 is adhesively constrained between the upper peek element 204 and the lower peek element 206.

Two springs 208 and 210 (constructed as wave springs in the preferred embodiment) are placed on either side of flanges 212 and 214 of the upper and lower peek housings 194 and 196, respectively, when the piezoelectric crystal assembly 194 is inserted into the outer shell 180. The springs position the crystal/hat assembly 190 in a null position and also allow the assembly to be preloaded so that it can withstand handling, tripping in and out of hole and drilling conditions.

A metal backing ring 216 between spring 210 and crystal/hat assembly 190 provides a solid backing for the generation of acoustic energy.

Two set screws 218 and 220 are installed into the outer shell 180 to hold the connector 198 assembly in place relative to the outer shell 180.

A piston 222 is placed on the top of the upper spring 208 and held against the outer shell 180 using a snap ring 224. The piston 222 preloads the piezoelectric crystal assembly 192 inside the outer shell 180.

Figure 19:
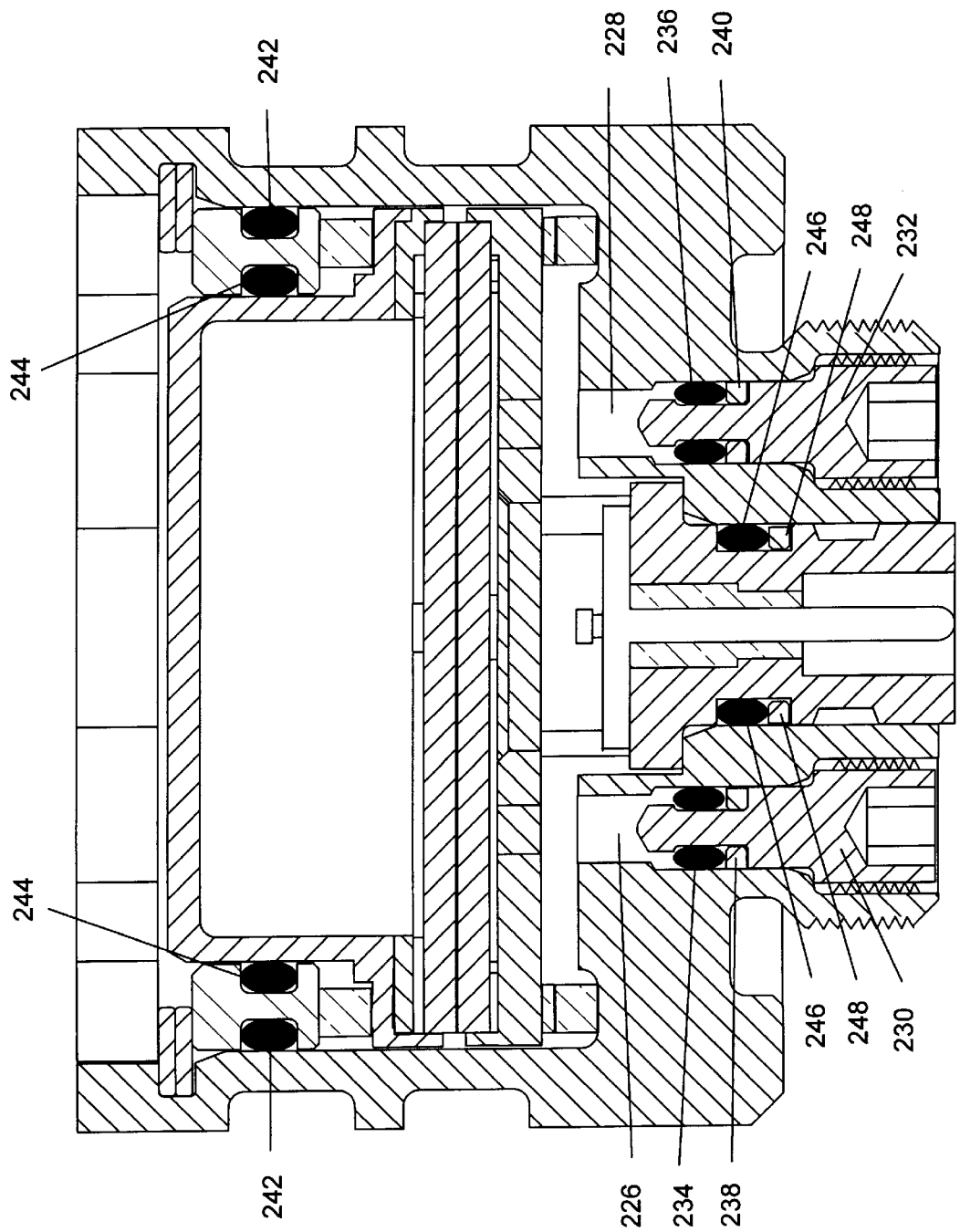
FIG. 19 is a section view of an acoustic transmitter according to the present invention along lines XIX on FIG. 12.

A chamber formed by the outer shell 180 and the crystal/hat assembly 190 is evacuated and filled through ports 226 and 228 with compensation fluid, as shown in FIG. 19. The ports are fitted with plugs 230 and 232 having high pressure o-rings 234 and 236 and back-up rings 238 and 240.

A sealed system, comprising o-rings 234, 236, 242, 244, and 246 and backup rings 238, 240 and 248, prevents the borehole fluid from reaching inside the electronic insert assembly and prevents the compensation fluid from escaping the chamber. It will be appreciated by those skilled in the art that the system air gap/o-ring 242 and 244 also acts as an acoustic isolator between the crystal assembly 192 and the body of the transmitter 180. This acoustic isolation further limits the acoustic energy emitted by the crystal in a direction parallel to its face, from coupling into the body of the transmitter 180, and through the body of the tool to the receivers.

Figure 20:
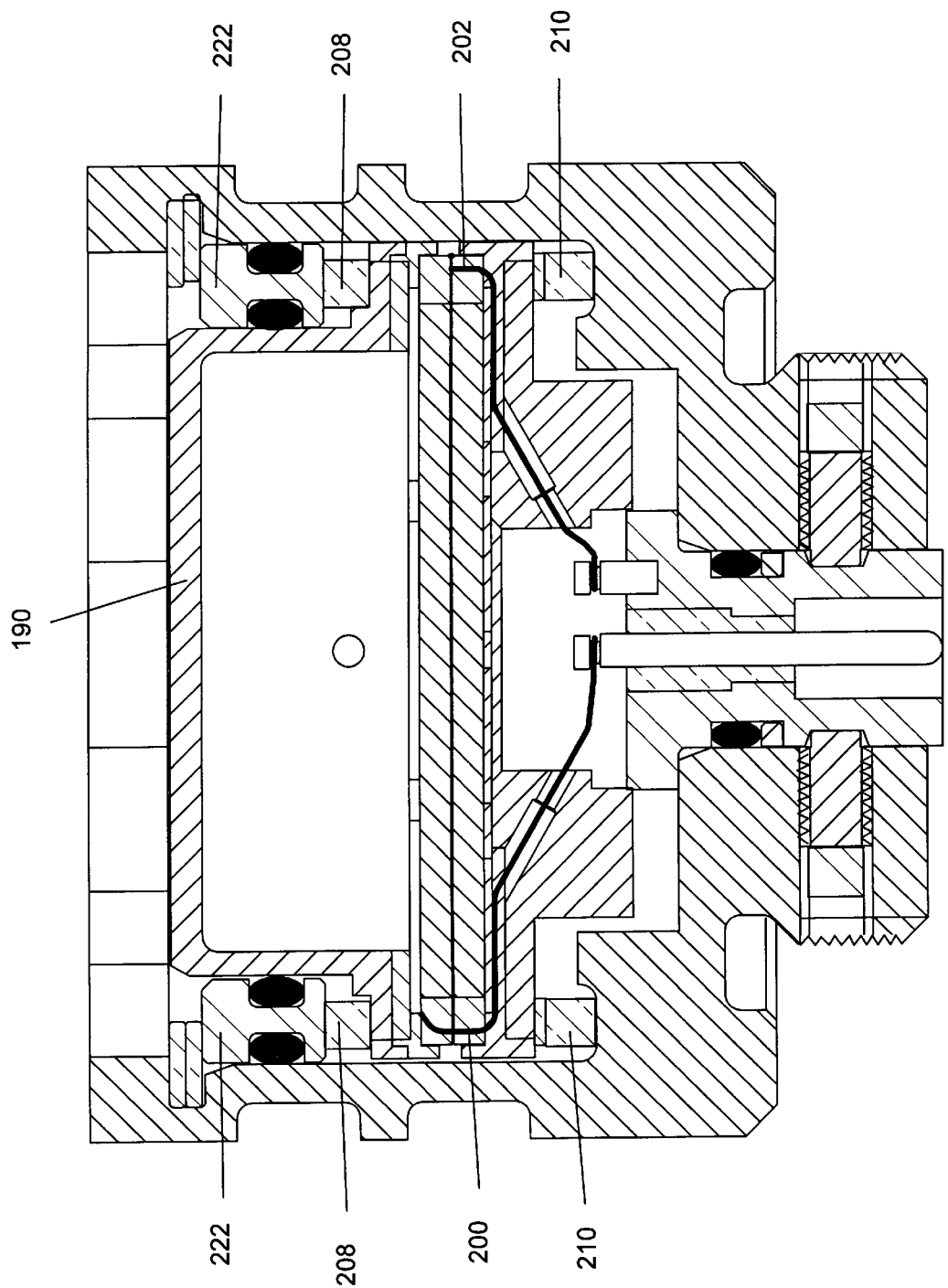

The oil volume inside the annular cavity will expand and contract with the changes in ambient pressure and temperature conditions. Upon any increase of the oil volume due to temperature, the crystal/hat assembly 190 acts as a piston and moves upward, as shown in FIG. 20, compressing spring 208 and expanding the oil volume. If however the oil volume is contracted due to an increase in the hydrostatic pressure, the piston 222 and the crystal/hat assembly 190 can both move downward as separate compensating pistons to reduce the oil volume. Downward movement of the crystal/hat assembly 190 compresses spring 210 and downward movement of piston 222 compresses spring 208. Adequate amount of lead wire 198 and 202 length and strain relief is provided to allow for the movement of the crystal/hat assembly 190 for temperature and pressure compensation relative to electrical connector 198. When the crystal/hat assembly 190 is in the position shown in FIG. 19 and in the position shown in FIGS. 17 and 18 and in any position between those two positions, it has no direct contact with the outer shell 180 because the two parts are separated by o-ring 242. This separation provides some acoustic isolation between the crystal/hat assembly and the outer shell.

The foregoing describes preferred embodiments of the invention and is given by way of example only. The invention is not limited to any of the specific features described herein, but includes all variations thereof within the scope of the appended claims.

What is claimed is:

1. An acoustic logging apparatus comprising
   a tool body;
   a housing;
   a transducer operating in the bending mode mounted in the housing, wherein
   the transducer operates such that it is excited by or emits acoustic energy in only one of the two directions substantially perpendicular to the face of the transducer.
2. The apparatus of claim 1 wherein the transducer is a unimorph.
3. The apparatus of claim 1 wherein the transducer is a bimorph.
4. The apparatus of claim 1 wherein the transducer is utilized as an acoustic transmitter.
5. The apparatus of claim 1 wherein the transducer is utilized as an acoustic receiver.
6. An acoustic logging apparatus comprising
   a tool body;
   a housing;
   a transducer operating in the bending mode mounted in the housing, wherein
   the housing is mounted substantially removed from the axis of the body.
7. The apparatus of claim 6 wherein the transducer is a unimorph.
8. The apparatus of claim 6 wherein the transducer is a bimorph.
9. The apparatus of claim 6 wherein the transducer is utilized as an acoustic transmitter.
10. The apparatus of claim 6 wherein the transducer is utilized as an acoustic receiver.
11. An acoustic transmitter comprising
    a piezoelectric crystal for use in an acoustic logging tool configured to generate acoustic energy in response to an electric signal, the acoustic energy generated in a preferred direction being at least 3 dB larger than the acoustic energy generated in a direction substantially perpendicular to the preferred direction.
12. The acoustic transponder of claim 11 wherein the piezoelectric crystal comprises a unimorph.
13. The acoustic transponder of claim 11 wherein the piezoelectric crystal comprises a bimorph.
14. An acoustic receiver comprising
    a piezoelectric crystal for use in an acoustic logging tool configured to generate an electrical signal in response to acoustic energy, the signal for acoustic energy of a magnitude received from a preferred direction being at least 3 dB larger than signals for acoustic energy of the magnitude received from a direction substantially perpendicular to the preferred direction.
15. The acoustic transponder of claim 14 wherein the piezoelectric crystal comprises a unimorph.
16. The acoustic transponder of claim 14 wherein the piezoelectric crystal comprises a bimorph.
17. An acoustic transponder comprising
    an outer sleeve;
    an inner assembly coupled to the outer sleeve, the inner assembly being substantially acoustically isolated from the outer sleeve.
18. An acoustic logging tool comprising
    an acoustic transmitter; and
    an acoustic receiver, the acoustic receiver having a different electrical ground from the acoustic transmitter.
19. An acoustic receiver for converting acoustic energy to an electronic signal comprising
    a hat;
    a piezoelectric crystal mounted within the hat; and
    a first compliant element separating the crystal from the hat.
20. The acoustic receiver of claim 19 wherein the hat comprises a thermoplastic.
21. The acoustic receiver of claim 19 wherein the thermoplastic comprises polyetheretherketone.
22. The acoustic receiver of claim 19 wherein the hat comprises a metal.
23. The acoustic receiver of claim 19 further comprising an excluder separated from the crystal by a second compliant element.
24. The acoustic receiver of claim 23 wherein the excluder comprises a thermoplastic.
25. The acoustic receiver of claim 23 wherein the thermoplastic comprises polyetheretherketone.
26. The acoustic receiver of claim 23 wherein the excluder comprises a metal.
27. The acoustic receiver of claim 23, further comprising
    a connector;
    a wire coupled to the connector and to the piezoelectric crystal;
    a portion of the wire being supported by the excluder.
28. An acoustic receiver comprising
    an outer sleeve having a flange;
    a hat being slidably mounted within the outer sleeve.
29. The acoustic receiver of claim 28 wherein
    the hat has a flange, the flange of the hat moving toward the flange of the outer sleeve as the hat slides into the outer sleeve; and
    a first compliant element between the flange of the hat and the flange of the outer sleeve.
30. The acoustic receiver of claim 29, further comprising
    a piston; and
    a second compliant element between the piston and the hat.
31. The acoustic receiver of claim 30 further comprising
    a securing element configured to secure the piston relative to the outer sleeve.
32. The acoustic receiver of claim 31 wherein the securing element comprises a snap ring.
33. The acoustic receiver of claim 28 further comprising
    a lower housing coupled to the outer sleeve;
    a port through the lower housing for communicating with a chamber formed by the outer sleeve, the hat and the lower housing;
    pressure compensating fluid for filling the chamber; and a seal for preventing the pressure compensating fluid from escaping the chamber.

34. The acoustic receiver of claim 33 wherein the pressure compensating fluid comprises oil.

35. The acoustic receiver of claim 33 wherein the seal comprises one or more o-rings.

36. The acoustic receiver of claim 33 wherein the seal separates the lower housing from the outer sleeve; and the seal separates the hat from the outer sleeve.

37. The acoustic receiver of claim 36 wherein said compensation fluid, said hat, and said lower housing compensate for pressure and temperature variations.

38. The acoustic receiver of claim 36 wherein a piezoelectric crystal is secured within the assembly comprising the hat and the lower housing.

39. The acoustic receiver of claim 36 wherein the hat and crystal assembly are configured to move relative to the lower housing.

40. The acoustic receiver of claim 39 wherein said movement compensates for pressure and temperature variations.

41. An acoustic transmitter comprising a main housing; and a hat slidably supported within the main housing.

42. The acoustic transmitter of claim 41 further comprising a compliant element separating the hat from the main housing.

43. The acoustic transmitter of claim 42 further comprising a support element rigidly separating the transducer housing from the compliant element.

44. The acoustic transmitter of claim 43 wherein the support element comprises metal.

45. The acoustic transmitter of claim 43 wherein the support element comprises a thermoplastic.

46. The acoustic transmitter of claim 45 wherein the thermoplastic comprises polyetheretherketone.

47. The acoustic transmitter of claim 41 wherein the hat comprises thermoplastic.

48. The acoustic transmitter of claim 47 wherein the thermoplastic comprises polyetheretherketone.

49. The acoustic transmitter of claim 41 wherein the hat comprises a metal.

50. The acoustic transmitter of claim 41 further comprising a piston engaging the main housing;

a first compliant element separating the upper side of the hat from the piston.

51. The acoustic transmitter of claim 50 further comprising a second compliant element configured to bias the hat against the first compliant element.

52. The acoustic transmitter of claim 41 further comprising a connector coupled to the main housing;

a wire coupled to the connector; and a portion of the wire being supported by the hat.

53. The acoustic transmitter of claim 41 further comprising a port through the main housing for communicating with a chamber formed by the main housing and the hat;

pressure compensating fluid for filling the chamber; and a seal system for preventing the pressure compensating fluid from escaping the chamber.

54. The acoustic transmitter of claim 53 wherein the pressure compensating fluid comprises oil.

55. The acoustic transmitter of claim 53 wherein the seal system comprises one or more o-rings.

56. The acoustic transmitter of claim 53 wherein said compensation fluid, said hat, and said lower housing compensate for pressure and temperature variations.

57. The acoustic transmitter of claim 53 wherein a piezoelectric crystal is adhesively secured within the assembly comprising the hat and the lower housing.

58. The acoustic transmitter of claim 53 wherein the hat and crystal assembly are configured to move relative to the lower housing.

59. The acoustic transmitter of claim 53 wherein said movement compensates for pressure and temperature variations.

60. An acoustic logging tool comprising an elongated body; and an acoustic transducer mated to the body in such a way that the acoustic transducer can be replaced in the field.

61. A method for transforming acoustic energy to an electrical signal comprising configuring a piezoelectric receiver in an acoustic logging tool to generate a signal in response to the acoustic energy, the signal for acoustic energy of a magnitude received from a preferred direction being at least 3 dB larger than signals for acoustic energy of the magnitude received from a direction substantially perpendicular to the preferred direction.

62. A method for transforming an electrical signal to acoustic energy comprising configuring a piezoelectric transmitter in an acoustic logging tool to generate acoustic energy in response to the electric signal, the acoustic energy generated in a preferred direction being at least 3 dB larger than the acoustic energy generated in a direction substantially perpendicular to the preferred direction.

63. A method for transforming between acoustic energy and an electrical signal comprising mounting a piezoelectric transducer in a hat, the hat being slidably mounted within a housing such that the hat slides into and out of the housing depending on the difference in pressure between the inside and the outside of the housing.

* * * * *